Figure 1:
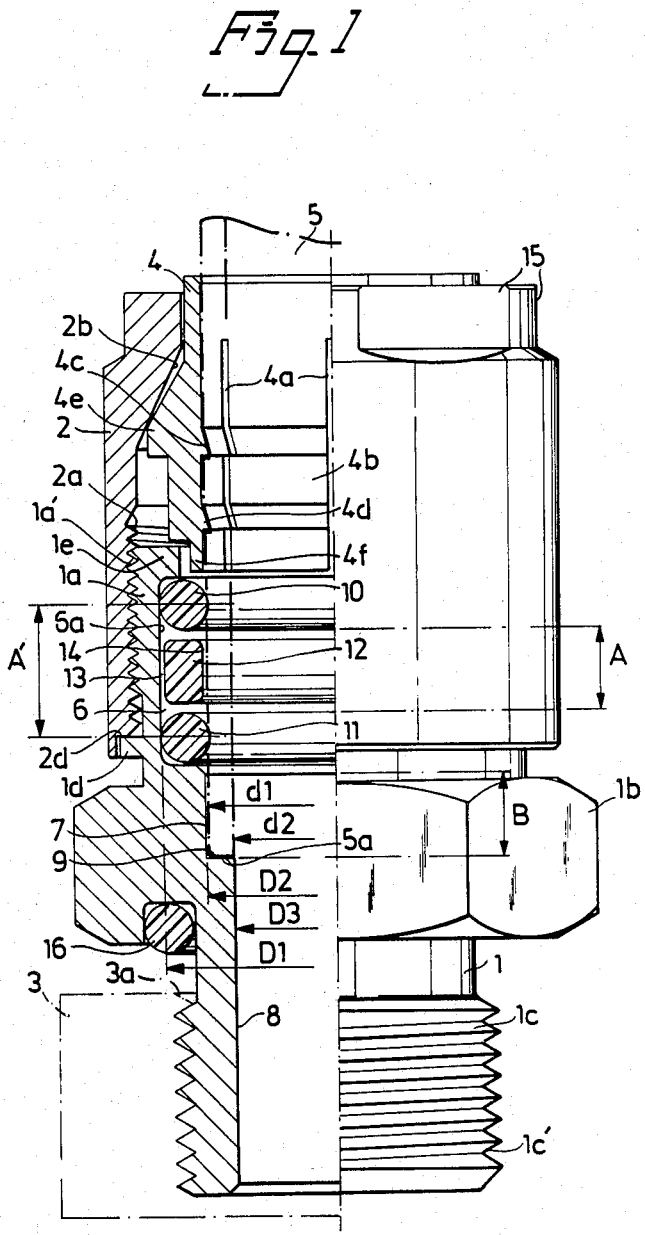

United States Patent [19]

Ekman

[11] Patent Number: 4,627,644
[45] Date of Patent: Dec. 9, 1986

[54] ARRANGEMENT FOR A PUSH-IN COUPLING

[76] Inventor: Kjell R. Ekman, Aberenrain 43, CH-6340 Baar, Switzerland

[21] Appl. No.: 521,766

[22] Filed: Aug. 9, 1983

[30] Foreign Application Priority Data

Aug. 27, 1982 [SE] Sweden .............................. 8204910

[51] Int. Cl.$^4$ ............................................ F16L 35/00
[52] U.S. Cl. ...................................... 285/3; 285/24; 285/249; 285/323; 285/331; 285/351; 285/369
[58] Field of Search .................. 285/322, 323, 351, 3, 285/24, 331, 249, 255, 369

[56] References Cited

U.S. PATENT DOCUMENTS

| 2,167,258 | 7/1939 | Wilson . | |
|---|---|---|---|
| 2,513,115 | 6/1950 | Sprigg . | |
| 3,645,563 | 2/1972 | Rochelle | 285/322 X |
| 4,006,921 | 2/1977 | Mohr | 285/323 X |
| 4,059,295 | 11/1977 | Helm | 285/323 X |
| 4,229,025 | 10/1980 | Volgstadt et al. . | |
| 4,239,266 | 12/1980 | Mynhier | 285/323 |

FOREIGN PATENT DOCUMENTS

| 143465B | 1/1977 | Denmark . | |
|---|---|---|---|
| 21795 | 1/1981 | European Pat. Off. | 285/323 |
| 2533902 | 7/1975 | Fed. Rep. of Germany . | |
| 2807508 | 8/1979 | Fed. Rep. of Germany | 285/322 |
| 3121899 | 2/1981 | Fed. Rep. of Germany . | |
| 1201165 | 12/1959 | France . | |
| 621908 | 4/1949 | United Kingdom . | |
| 1379466 | 1/1975 | United Kingdom . | |
| 1494323 | 12/1977 | United Kingdom . | |
| 2073350A | 10/1981 | United Kingdom . | |
| 2080467A | 2/1982 | United Kingdom . | |
| 2095780A | 10/1982 | United Kingdom . | |

OTHER PUBLICATIONS

Search report of Institut National de la Propriete Industrielle for Fr. 83 13 808.

Primary Examiner—Dave W. Arola
Attorney, Agent, or Firm—Pollock Vande Sande & Priddy

[57] ABSTRACT

An arrangement for rapid and simple push-in connection of one end of a hose, pipe or similar element. The outer surface of the end is made of a soft material into which at least one retaining device appertaining to the arrangement can be forced to retain the end inside the arrangement. The arrangement comprises an outer part, an insertion part disposed therein which bears the retention devices, and seals disposed in a cavity which can co-act with the external surface of the end. The insertion part has an inherent retaining or locking effect on the pipe or other element and a retaining position wherein it is movable in relation to the outer part. The seals comprise two sealing devices arranged one on either side of a guiding device disposed in the cavity. This guiding device is provided to guide the end while it is being pushed in. After the push-in connection has been made, the guiding element continues to center the end inside the cavity. The guiding and sealing elements form a vibration-damping double seal arrangement with the sealing devices located at a distance from one another, viewed in the longitudinal direction.

15 Claims, 6 Drawing Figures

ARRANGEMENT FOR A PUSH-IN COUPLING

TECHNICAL FIELD

The present invention relates to an arrangement for the rapid and simple push-in connection of one end of an element through which medium or pressure is conducted, such as a hose, pipe, duct or similar element, for example, and preferably utilizing a retaining function in that at least the external surface of the said end is constructed of a soft material into which at least one retaining device appertaining to the arrangement can be pushed to retain the end. The arrangement comprises an outer part, an insertion part disposed therein which may bear the retaining devices, and seals disposed in a cavity and able to co-act with the external surface of the end to seal the interior of the outer part and of the medium or pressure-conducting element from the exterior of the outer part and of the medium or pressure-conducting element.

STATE OF THE ART

Coupling arrangement for the push-in connection of hoses, ducts or pipes of various kinds are already known. One such known arrangement can comprise an inserted sleeve which is slit over part of its length in the longitudinal direction to form spring elements which can be urged in the radial direction by means of a nut for drawing them together, incorporated in the arrangement. On the inner surface of the spring elements there are barb-shaped grooves or ridges which are designed to co-act with the material of the outer surface of the hose or pipe after the end of the hose or pipe has been inserted in the coupling arrangement. Due to the grooves or corresponding shaping the end can be pushed in while at the same time separation between the hose/pipe and the coupling arrangement is prevented.

The known arrangement also comprises sealing devices which are designed to provide a seal between the outer surface on the end of the hose or pipe which has been pushed into the coupling arrangement and a sealing wall in the coupling arrangement.

DESCRIPTION OF THE INVENTION

The Technical Problem

With the known coupling arrangements the problem arises of providing a suitable sealing arrangement which can function reliably over a long period of time. This involves disadvantages, particularly in certain applications such as in brake systems, optical systems, etc., for example, where an interruption may result in serious consequences. In such applications consideration must be given as to whether such so-called "plug-in" type coupling arrangements should be used at all. The alternative is to subject the above-mentioned systems to frequent and expensive servicing and checking.

It is also important that the sealing arrangement should operate in conjunction with the retaining arrangement and the other parts of the coupling arrangement so that rapid, simple and long-lasting reliable push-in connection of the hose, pipe, etc. can be obtained despite an otherwise technically simple construction.

The Solution

The arrangement according to the present invention obviates in particular the above-mentioned problem, and the new arrangement can be regarded as being characterised primarily in that the insertion part is designed to occupy a retaining or locking position wherein it is movable relative the outer part. The part is then positioned inside the outer part in front of the above mentioned seals, viewed in the insertion direction of the said end.

As a development of the concept of the invention seal arrangement comprises two sealing devices disposed one on either side of a guiding device disposed in the cavity and effecting the guiding-in of the end while it is actually being pushed in and also continuing to centre the end in the cavity after the push-in connection, and in that the guiding and sealing devices are designed to provide a vibration-damping double seal, with the sealing devices located spaced apart from each other, viewed in the longitudinal direction of the end.

As a development of the concept of the invention it is proposed that the sealing devices can be formed by two separate sealing rings, which are preferably standard, commercially available O-ring seals. Alternatively, the sealing devices, together with the guiding device, can be incorporated to form a single unit disposed in the said cavity. The spacing between the sealing devices is important, and depends on the dimensions or size of the coupling arrangement. Consequently, it is proposed according to the invention that, with the smallest size of coupling arrangement, the spacing is at least 0.3–0.5 mm. With larger sizes obviously the spacing can be substantially greater and may amount to 8 mm, for example. With intermediate sizes of coupling arrangement a spacing of 2–5 mm is preferably chosen.

According to the developments the cavity for the guiding and sealing device can have an extent in the axial direction of the coupling arrangement which exceeds the corresponding combined extent of the guiding and sealing devices. In this way, the respective guiding and sealing devices, or the single unit if used, can carry out a longitudinal displacement movement in the axial direction, which provides a large amount of adaptability to the different types of couplings which occur. Obviously, it is basically possible to chose a cavity with a volume which substantially corresponds to or only slightly exceeds the sectional volume of the guiding and sealing devices.

In accordance with the concept of the invention, the guiding device should have substantially no sealing function relative to the element conducting medium or pressure and the outer part. The guiding device can thus be made with little or no elasticity. The guide device can consequently be made of polytetrafluoroethene, polyoxymethylene, metal—e.g. steel, or a similar material.

The tolerances for the guiding device relative to the axial wall of the cavity and the hose, pipe, or the like are also important, and the said further developments allow for play between the external and internal surfaces of the guiding device relative to the wall of the cavity and the external surface of the hose, pipe, etc., respectively.

In accordance with the further developments the guiding and sealing devices should be arranged in a first outer part element which has an axial through-bore which is divided in the axial direction into three different sections with three different diameters. The first section, which is located at the first end of the first outer part element, forms the cavity for the guiding and sealing devices. A second section serves as an intermediate section and continues into the third section via a shoulder. The first section has the largest diameter, the second section the next largest diameter and the third section the smallest diameter. The shoulder forms an abutment surface for the free end face of the end of the hose or pipe and thus limits the distance for which the hose or the pipe may be inserted. The diameter of the second section corresponds substantially to the external diameter of the hose or pipe, while the diameter of the third section corresponds substantially to the internal diameter of the hose or pipe.

Viewed in the push-in direction, the guiding and sealing devices are disposed behind the insertion part which, by means of a second outer part element which can be connected onto the first outer part element, occupies either a movable or fixed position with respect to the first and second outer part elements. The insertion part bears the retaining devices on its inner surface and is made with longitudinally extending slits in a manner which is known per se, forming a spring element which, depending on force transmitted from the second outer part element, urges the retaining devices towards the outer surface of the end of the hose or pipe. The force transmitted in this case depends on the amount of relative longitudinal displacement between the first and the second outer part elements.

The further developments also allow for the guiding and sealing devices, and also the insertion part, to be doubled. In this way a guiding and sealing device and an insertion part can be mounted in both ends of the outer part, which enables it to be used as a connecting piece for the ends of two medium or pressure-conducting elements which can be pushed into the arrangement.

Advantages

With the arrangement proposed above a double sealing arrangement is obtained which is also vibration absorbing, so that vibrations transmitted to the connecting arrangement are largely counteracted, with the result that there is no tendency for the coupling arrangement and the hose, pipe, etc. to separate.

The end of the hose or pipe involved is guided longitudinally into the coupling arrangement, which has the advantage that any tendency of the hose or the like to diverge is prevented from causing separation of the hose or pipe.

The new coupling arrangement also fulfils demands for reliable sealing even with high medium pressures, e.g. with pressure of up to 130 bar. Despite the fact that pressure variations in the medium tend to urge the hose or pipe to move in the sealing devices, such movement is effectively prevented by the guiding device which holds the end of the hose or pipe involved centered in the sealing cavity.

The sealing arrangement is designed to function also in coupling arrangements which are equipped with devices (nuts) which influence the inner sleeve so as to enable the inner sleeve to be both fixed and movable relative to the rest of the coupling arrangement.

The new coupling arrangement is suitable for various types of hose and pipe, and the "TRELLFLEX" Air Brake SAE J 844, type 3b hose which is available on the open market can be named as an example. The coupling arrangement can be used as a coupling device (or nipple) for different systems to or from which medium or pressure is to be supplied. The coupling arrangement can also be used as a connecting device. The hose or the like may have external dimensions of $\frac{1}{4}''-\frac{5}{8}''$, for example.

LIST OF FIGURES

Figure 2:
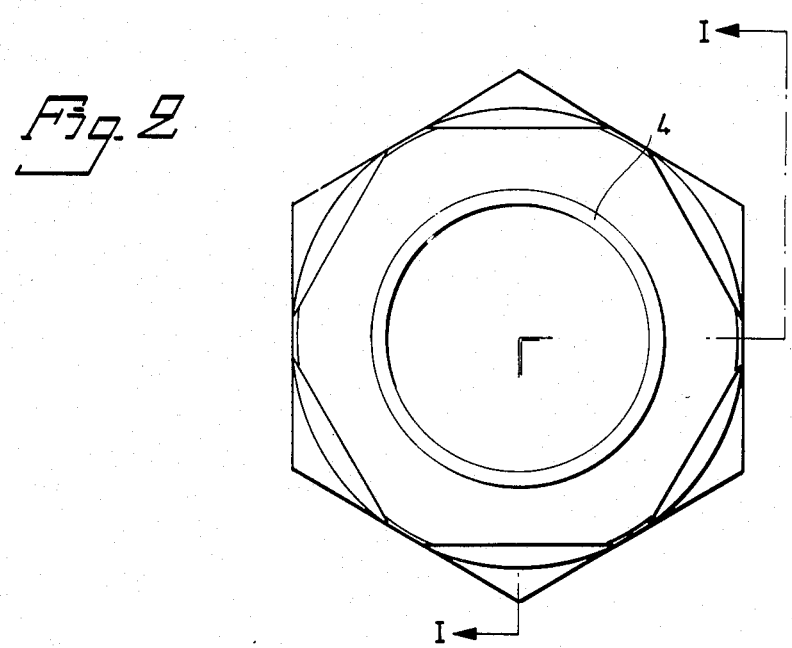
Figure 4:
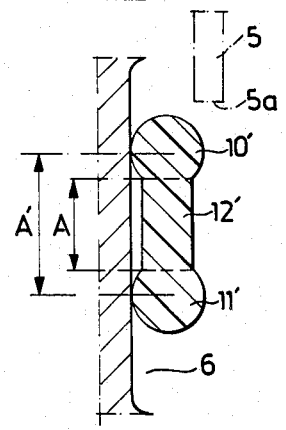
Figure 3:
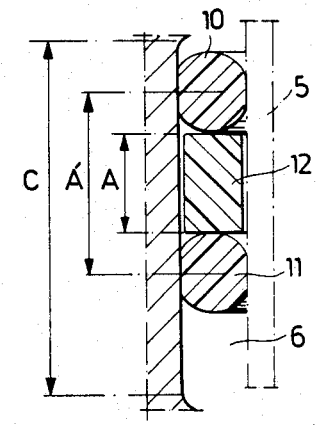
Figure 5:
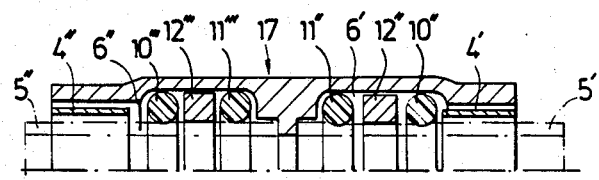

An embodiment of an arrangement which displays the significant characteristics of the inventions will be described in the following by way of example, with reference to the accompanying drawing, in which FIG. 1 shows a coupling arrangement, partially sectioned, in which the end of a hose is inserted and anchored, FIG. 2 shows a horizontal view, showing the coupling arrangement in FIG. 1 from one end, FIG. 3 shows a section showing the sealing devices comprised in the coupling arrangement, FIG. 4 shows a modified embodiment of the sealing device shown in FIG. 3, while FIG. 5 shows schematically a coupling arrangement which has been modified compared with the embodiment shown in FIG. 1.

Figure 6:
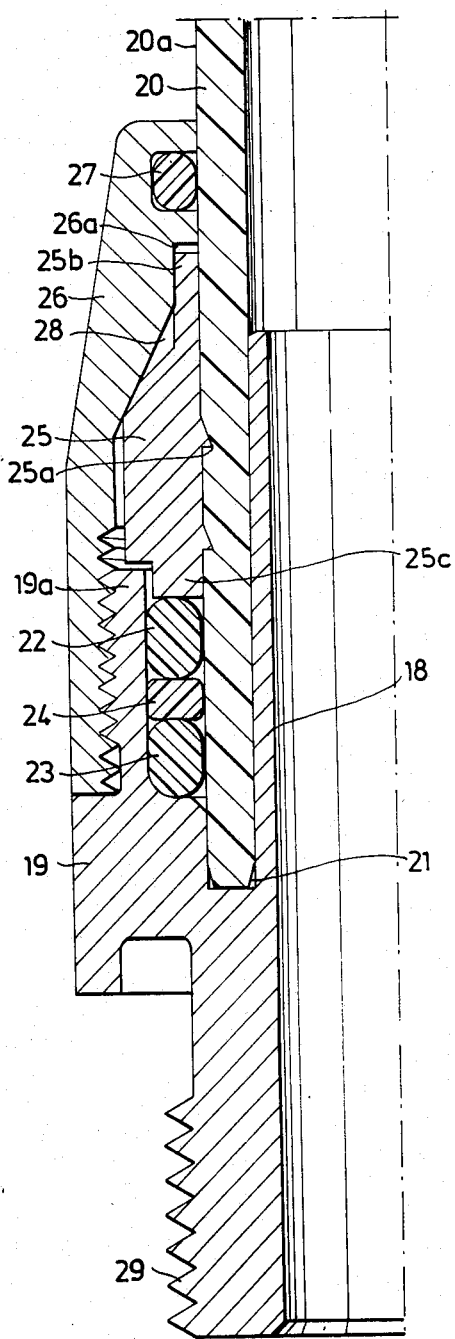

FIG. 6 shows half the length section of a second embodiment of a coupling arrangement.

PREFERRED EMBODIMENT

In FIG. 1 a first outer part element is designated 1 and a second outer part element is designated 2. The first outer part element is equipped with a sleeve-shaped part 1a at its first end. On the outer surface of the central part of the outer part element 1 a hexagonal nut 1b is mounted. At its other end the first outer part element is made with a connecting section 1c which has an outwardly facing thread 1c'. Via this thread the coupling arrangement as a whole can be securely screwed into an element 3, to which the coupling arrangement is to be attached and which is equipped with a tapped aperture 3a, the thread of which corresponds to the thread 1c'.

The element 3 represents all the types of element which can be provided with the coupling arrangement in question.

The sleeve-shaped part 1a is equipped with an external thread 1a' onto which the second outer part element 2 can be securely screwed via a corresponding internal thread 2a. The first and second outer part elements can be joined together in some other way than by means of the threads 1a' and 2a, such as by means of a bayonet fixing or some other type of connecting arrangement.

The coupling arrangement is also equipped with an insertion part 4 which is provided with a relatively large number of longitudinally extending slits 4a which extend from the inner end of the insertion part towards the outer end thereof, and terminate at a distance from the outer end which is approximately 1/5 of the total length of the insertion part. The number of slits may be 6–8, for example. By means of the slits a spring element 4b is formed which can be acted upon in the radial direction by means of the second outer part element 2. The spring element 4b bears on its inner surface barb-shaped retaining devices 4c and 4d which are located at a distance from each other, viewed in the axial direction of the insertion part. The barb-shaped retaining devices are made with radially short lower surfaces and obliquely set and elongated upper surfaces.

The second outer part element has an inwardly facing tapered surface 2b which can co-act with an outwardly facing flange 4e on the insertion part. The tapered surface 2b and the flange 4e are shaped in such a way that the position of the spring elements in the radial direction depends on the amount of relative longitudinal displacement between the first and the second outer part elements. The further the second outer part element is drawn onto the first outer part element, the further the spring elements are forced radially inwards, and vice versa.

The first outer part element is also equipped with a so-called snap-off rim 1d. The said snap-off rim forms a distinct first stopping position for the second outer part element 2 which rests in the first distinct stopping position against the upper surface of the snap-off rim via a corresponding abutment surface 2d on its inner end. In the first stopping position accomplished via the snap-off rim the second outer part element 2 holds the spring elements 4b pressed radially inwards by a predetermined amount. The elasticity of the snap-off rim 1d can also be used so that in this stopping position the snap-off rim functions as a sprung stop for the second outer part element.

If it is desired to spring the spring elements in further, the second outer part element can be influenced, by screwing it further on, so that the snap-off rim snaps off, after which the second outer part element can be screwed further onto the first outer part element so that further longitudinal displacement is achieved between the first and the second outer part elements.

The end of a hose is shown in FIG. 1 pushed into the coupling arrangement and is designated by the reference numeral 5. The end of the hose appertains to a device which is designed to conduct medium (hydraulic oil, optical beam conductors, air, etc) and/or pressure in one or both directions. The end of the hose is retained in the coupling arrangement by means of the spring elements 4b and the retaining force can be varied as described above, according to the extent to which the second outer part element is screwed onto the first outer part element 1. With extreme medium pressures the second outer part element can be made to snap off the snap-off rim and further screwing on can take place, resulting in further pressing in of the spring elements towards the end of the hose. The barb-shaped devices 4c and 4d penetrate thereby further into the material of the outer surface of the end of the hose, so that the radially lower surfaces on the barb-shaped devices counteract any tendency of the end of the hose to be pulled out, while at the same time allowing the end of the hose to be inserted easily. The inner part 4 may be equipped with a different number of retaining devices 4c, 4d, e.g. one, three, four or more.

The first outer part element is equipped with a longitudinal through-bore for the medium involved and the end of the hose. The through-bore has three sections 6, 7 and 8. The first section which is located at the sleeve-shaped part 1a has the greatest diameter D1. The first section forms a cavity for the sealing device which is described in more detail in the following. The second section 7 forms an intermediate section and has a diameter D2 which is less than the diameter D1. The third section 8 is located at the rear part of the second outer part element and has the smallest diameter D3. An abutment surface 9 is formed between the second and third sections 7 and 8. The diameter D2 corresponds substantially with the external diameter d1 of the end of the hose and the diameter D3 corresponds substantially with the internal diameter d2 of the end of the hose. The abutment surface 9 forms a stop for the end face 5a on the end of the hose. The sleeve-shaped part 1a is equipped at the front with an inwardly-bent flange 1e to form a cavity 6 for the guiding and sealing devices. The inwardly-bent flange is fixed in the embodiment shown, but it can also be made as a part which can be screwed onto the sleeve-shaped part 1a. Alternatively, the flange may be omitted altogether.

The insertion part 4 extends via its inner end 4f to a point level with the said flange 1e. In the position shown in FIG. 1, with the second outer part element 2 screwed tight, the insertion part 4 lies loosely inside the second outer part element so that it is able to rotate and move slightly in the axial direction. This means that the fixing of the end 5 of the hose or pipe in question is movable to a corresponding extent. However, when the second outer part element is influenced so that the snap-off rim 1d snaps off, the inner part 4 presses against the flange 1e so that a rigid connection is achieved between the outer part and the inner part 4. If the flange 1e is omitted, the insertion part is designed so that it is pressed instead against the free end of the sleeve-shaped part 1a thus formed.

In the embodiment example shown in FIG. 1, the sealing device comprises preferably two separate sealing devices which in the present case preferably take the form of two O-ring seals 10 and 11. The seals can display a Shore hardness of preferably 70–90. The cavity 6 is made with a gap or width which is less than the section of the O-ring seals, so that deformation of the said section occurs when the end involved is pushed into the coupling arrangement. In a non-compressed state the section of the respective O-ring seals exceeds the cavity gap 6 by approximately 20% of its total diameter. The relative dimensioning of the width of the cavity gap and the section diameter of the seals 10 and 11 is naturally dependent primarily on the Shore hardness selected for the seals, and can therefore vary between 10 and 40%.

Between the seals 10 and 11 a guiding device 12 is inserted which is not itself designated to have any significant sealing effect against the outer surface of the end of the hose and the axial surface 6a of the cavity 6. The guiding device has as its main function the guiding of the end of the hose when it is being pushed into the coupling arrangement, and the holding of the actual part of the end of the hose centered in the cavity 6 after the push-in connection has been made. Any movement which the end of the hose might carry out is effectively counteracted by the guiding device. The amount of play, calculated on the diameter, between the guiding device and the wall 6a of the cavity lies within the range of 0.05–0.5 mm, a value preferably being chosen within the range 0.1–0.3 mm. Relative to the outer surface of the end of the hose, the inner surface of the guiding device has an amount of play, calculated on the diameter, which is selected within the range 0.02–0.5 mm, and preferably within the range 0.05–0.2 mm. The length of the guiding device in the axial direction of the coupling arrangement is at least 0.3–0.5 mm in the smallest size of the coupling arrangement as such.

With the largest sizes it is conceivable that the length would be approximately 8 mm or thereabouts. With normal sizes of the said coupling arrangement a length of approximately 2–3 mm is preferably chosen. In the present case the cavity 6 is made with a longitudinal extent which exceeds the total longitudinal extent of the guiding and sealing devices 12 and 10, 11 respectively. In the Figure the narrowest gap between the boundary surfaces of the sealing devices 10 and 11 has been indicated by A, while the distance between their centers is indicated by A'. Due to the guiding device which lies between them the sealing devices 10 and 11 are lodged at a distance from each other so that an effective double sealing effect is obtained relative to the actual part on the end 5 of the hose. The distances A and A' shown in FIG. 1 can vary from one coupling to another. It is important that the distance A should not be less than a predetermined value, which is determined by the extent of the guiding device in the axial longitudinal direction of the coupling arrangement. In FIG. 1 the play between the outer surface of the guiding device and the cavity wall 6a has been designated 13, while the play between the inner surface of the guiding device and the outer surface of the end of the hose is designated 14.

The second section 7 has a longitudinal extent in the axial direction of the coupling arrangement which is designated B. This longitudinal extent B is substantially the same as or exceeds the length of the guiding device 12 in the same direction. The insertion sleeve has longitudinal extent which corresponds substantially to the total longitudinal extent of the first and second sections. In this way extremely extensive guiding of the end of the hose is obtained, with the retaining arrangement positioned furthest out and followed by the sealing arrangement. Guiding is terminated by the third section which also provides a distinct stop via the abutment surface 9. The total length of the guiding effect exceeds or is substantially equal to half the length of the coupling arrangement.

Furthermore, on its inner free end the insertion part has a guide edge 4f which is guided against the inner surface of the inwardly projecting flange 1e. The parts 1, 2 and 4 are expediently made of metal, e.g. steel, brass, a suitable brass alloy, etc. The material of the hose or pipe 5 may be plastic, rubber or other similar material. The hoses which can be used in this connection are available on the open market, as mentioned above.

The top of the second outer part element is provided with a spanner grip 15 which is machined out of the material of the part. The machining has been carried out at a point where the thickness of the material is greatest. The nut 1b is equipped with a lower groove in which a seal 16 is inserted. The said seal is provided to seal the lower surface on the element 3 which is not shown, however, in FIG. 1.

FIG. 3 shows that the narrowest boundary spacing A between the sealing devices 10 and 11 is the same as the length of the guiding device 12. The volume of the cavity 6 exceeds the total volume of the guiding and sealing devices. The length of the cavity has been designated C.

As shown in FIG. 4, the sealing devices 10' and 11' can be integrated with the guiding device 12' to form a single unit. The distances A and A' are fixed in this instance.

The construction shown in FIG. 1 provides an embodiment of the coupling arrangement which is intended to be screwed securely on a part, an object, an instrument, etc., via a thread 1c'. The outer part element 1 can be dispensed with altogether or may be equipped with a valve unit (not shown in FIG. 1). With the coupling arrangement a connection is obtained between the inside of the element 3 in question and an element connected to the other end of the hose 5. The principle of the new coupling arrangement can also be applied in the case where the coupling arrangement is serving as a connecting unit between the ends of two hoses. FIG. 5 shows this case chematically. In this instance, the coupling unit has been designated 17 and has two cavities 6' and 6". The coupling unit is provided at its respective ends with insertion sleeves 4' and 4", corresponding to that shown in FIG. 4. In the respective cavities sealing devices 10", 11" and 10''', 11''' respectively, and guiding devices 12" and 12''', respectively, are inserted. In detail, the various parts look and function as described above.

As the material for the sealing devices or the sealing sections in the combination shown in FIG. 4, standard sealing rings can be used. The material may be a plastic, such as polytetraflouroethene, polyoxymethylene.

The invention is not restricted to the embodiment illustrated above, but may be subjected to modifications within the framework of the following patent claims and the concept of the invention. Thus, for example, the section 7 may be tapered somewhat at the end nearest the abutment surface 9. The tapered wall part may then preferably be approximately $\frac{1}{2}$ B or $\frac{1}{2}$-$\frac{1}{4}$ B and the half cone angle for the section 7 will be chosen within the range 1°-5°. The tapered section eliminates the effect of any possible tolerances at the end of the hose or the like. The tapered part provides definitive centering of the outermost part of the end.

FIG. 6 shows a modified embodiment which corresponds to some extent to the coupling shown in FIG. 1. However, there is a tube-shaped counter-holding device 18 which is fixed (as shown in FIG. 6) or loose relative to the casing 19. The element 18 is used when the hose 20 is made of softer material, and thus endows the coupling with a slit-shaped cavity 21. The cavity 21 extends past the sealing and centering devices 22, 23 and 24 respectively. The device 18 extends past the retaining device 25a on the insertion part 25. The element 26 is sealed against the outer surface 20a of the hose 20 by means of a further sealing device 27. The part 25 in this embodiment example assumes only a movable retaining or locking position relative to the parts 19, 26 and thus forms an expansible element which allows the insertion of the end 20 of the hose and retention of the end after insertion. The expansible effect is achieved, as in FIG. 1, by use of longitudinally extending slits or cut-outs (not shown), the length and number of which may be varied according to the degree of retention effect with which the insertion part is to be endowed. The part 25 is guided into a corresponding cut-out 26a by a part, preferably hollow cylindrical part 25b. In this case the casing part 19a does not have the abutment flange for the sealing and centering devices 22, 23 and 24 respectively. The end face 25c of the insertion part forms the abutment surface instead. The part 25 is able to carry out a certain amount of axial longitudinal displacement movement in the cut-out 28 so that there is a certain amount of movement available for fixing in the hose. The sealing and centering arrangements are as above. The part 24 also functions as a so-called "back-up".

With the construction shown, the coupling 19, 26 can be prepared for simple automatic assembly, the part 26 being endowed with its terminal position before the end of the hose is inserted in the cavity 21. The end of the hose can thereafter be inserted into the position shown in FIG. 6 and is directly retained in the coupling due to the inherent retaining effect of the part 25. After assembly the part 26 does not require rotation to lock it in, which simplifies assembly, e.g. with a robot. The coupling is fastened, preferably before application of the hose, in a part which is not shown and in which it should be possible to fix the coupling securely.

I claim:

1. A coupling device for the rapid and simple push-in connection of one end of a first element to a second element through which fluid, and/or pressure exerted by fluid, is conducted utilizing a retaining arrangement where at least the external surface near said end of said first element is made of a soft material into which at least one retaining means of said arrangement can be engaged after said end has been pushed in to retain said end, said arrangement comprising: an outer part having a first outer part element and a second outer part element, said second outer part element having a tapered inner wall and said second outer part element being interconnected onto said first outer part element; an insertion part confined between said tapered inner wall surface of said second outer part element and an end surface of said first outer part element, said insertion part further bearing said retaining means; a cavity formed along the inner wall in said first outer part element and a seal arrangement disposed in said cavity for coacting with the external surface of said end of said first element to seal the inside of the outer part and the fluid and/or pressure exerted by the fluid from the exterior of the outer part, said seal arrangement comprising two sealing devices and a guiding device, said sealing devices disposed one on each side of said guiding device, said guiding device effecting the guiding of said end while it is being pushed in and also continuing to center the end in the cavity after the push-in connection has been completed, wherein said guiding and sealing devices are adapted to provide a vibration-damping double seal with the sealing devices spaced apart from each other as viewed in the longitudinal direction of the end, wherein the insertion part due to its resilient qualities has an inherent retaining effect on said end, wherein said insertion part is longitudinally movable inside the outer part relative to the outer part, between said tapered wall of said second outer part element and said end surface of said first outer part element and in front of the seals, viewed from the insertion direction of said end, wherein said insertion part has a reduced end portion extending into said second element toward said sealing means, and wherein an L-shaped radial gap is formed between said end of said insertion part and said end surface of said first outer part element for preventing removal of said sealing means from the sealing position.

2. A coupling device according to claim 1 wherein the sealing devices consist of two separate O-ring seals.

3. A coupling device according to claim 1 wherein the sealing devices, together with the guiding device, are incorporated in a single unit arranged in said cavity.

4. A coupling device according to claim 3 wherein the narrowest surface-surface gap (A) between the sealing devices is at least 0.3 mm.

5. A coupling device according to claim 3 wherein the cavity has an extent in the axial direction of the outer part which is greater than the single sealing unit so that said single unit can carry out a longitudinal displacement movement in the axial direction.

6. A coupling device according to claim 1 wherein the cavity has an extent in the axial direction of the outer part which is greater than the corresponding combined extent of the guiding and sealing devices, so that the respective elements of the guiding and sealing devices can carry out a longitudinal displacement movement in the axial direction.

7. A coupling device according to claim 1 wherein the guiding device has substantially no sealing function relative to the fluid and/or pressure and the outer part, and is substantially non-elastic, and is made of material selected from the group consisting of polytetrafluoroethene, polyoxymethylene and metal.

8. A coupling device according to claim 1 wherein the guiding device has a first amount of play relative to the axial wall of the cavity within the range of 0.05-0.5 mm, and a second amount of play relative to the outer surface of the first elements within the range of 0.02-0.5 mm.

9. A coupling device according to claim 1 wherein the guiding device has a first amount of play relative to the axial wall of the cavity within the range of 0.1-0.3 mm, and a second amount of play relative to the outer surface of the first elements within a range of 0.05-0.2 mm.

10. A coupling device according to claim 1, wherein said guiding and sealing devices are arranged in said first outer part element which has an axial throughbore which is divided in the axial direction into three different sections with different diameters, the first section, which has the largest diameter and is located at the first end of the first outer part element, forming the cavity for said guiding and sealing devices, the second section, which has the next largest diameter and forms a middle section, being designed to accommodate the free part of said end, and the third section, which has the smallest diameter, extending out to the other end of the first outer part element, and wherein a shoulder which marks the transition between the second and third sections forms an abutment surface which can coact with the end edge of said free part, said next largest diameter corresponding substantially to the external diameter of said end, and said smallest diameter corresponding substantially to the internal diameter of said end.

11. A coupling device according to claim 10 wherein said guiding and sealing devices are arranged behind the insertion part, and said insertion part bears on its inner surface said retention devices and is also constructed with longitudinally extending slits to form a spring element for urging the retention devices in the direction of the outer surface of said end.

12. A coupling device according to claim 10 wherein said first outer part element further comprises an elongated, cylindrical member extending upwardly within said axial throughbore, said member having an outer diameter smaller than the diameter of said middle section and being spaced from said middle section, whereby a slit-shaped cavity is formed between said middle section and said member for insertion of the end of said free part and counter-holding said end.

13. A coupling device according to claim 12 wherein said member is an integral part of said first outer part element.

14. A coupling apparatus wherein one end of each element is provided with a coupling device, according to claim 1.

15. A coupling device for the rapid and simple push-in connection of one end of a first element to a second element through which fluid, and/or pressure exerted by fluid, is conducted utilizing a retaining arrangement where at least the external surface near said end of said first element is made of a soft material into which at least one retaining means of said arrangement can be engaged after said end has been pushed in to retain said end, said arrangement comprising: an outer part having a first outer part element and a second outer part element, said second outer part element having a tapered inner wall and said second outer part element being interconnected onto said first outer part element; an insertion part confined between said tapered inner wall surface of said second outer part element and an end surface of said first outer part element, said insertion part further bearing said retaining means; a cavity formed along the inner wall in said first outer part element and a seal arrangement disposed in said cavity for coacting with the external surface of said end to seal the inside of the outer part and the fluid and/or pressure exerted by the fluid from the exterior of the outer part, said seal arrangement comprising two sealing devices and a guiding device, said sealing devices disposed one on each side of said guiding device, said guiding device effecting the guiding of said end while it is being pushed in and also continuing to center the end in the cavity after the push-in connection has been completed, wherein said guiding and sealing devices are adapted to provide a vibration-damping double seal with the sealing devices spaced apart from each other as viewed in the longitudinal direction of the end, wherein the insertion part due to its resilient qualities has an inherent retaining effect on said end, wherein said insertion part is longitudinally movable inside the outer part relative to the outer part, between said tapered wall of said second outer part element and said end surface of said first outer part element and in front of the seals, viewed from the insertion direction of said end, wherein said guiding and sealing devices are arranged in said first outer part element which has an axial throughbore which is divided in the axial direction into three different sections with different diameters, the first section, which has the largest diameter and is located at the first end of the outer part element, forming the cavity for said guiding and sealing devices, the second section, which has the next largest diameter and forms a middle section, being designated to accomodate the free part of said end, and the third section, which has the smallest diameter, extending out to the other end of the first outer part element, wherein a shoulder which marks the transition between the second and third sections forms an abutment surface which can coact with the end edge of said free part, said next largest diameter corresponding substantially to the external diameter of said end, and said smallest diameter corresponding substantially to the internal diameter of said end and wherein said guiding and sealing devices are arranged behind the insertion part, and said insertion part bears on its inner surface said retention devices and is also constructed with longitudinally extending slits to form a spring element for urging the retention devices in the direction of the outer surface of said end and wherein by means of said second outer part element and a snap-off rim located on the first outer part element and in the non-snap-off state holding the second outer part element in a first position, the insertion part is movable relative to the first and second outer part element in said non-snap-off state, and in the snap-off-state the second outer part having moved to a second position, said insertion part assumes a fixed position relative to the first and second outer part elements.

* * * * *